Nov. 14, 1961 J. VACKÁŘ ET AL 3,009,112

LOW-FREQUENCY AMPLIFIER CIRCUIT

Filed Jan. 2, 1959 2 Sheets-Sheet 1

INVENTORS
Jiří Vackář
Stanislav Zadníček
By Richard [illegible] Agt

LOW-FREQUENCY AMPLIFIER CIRCUIT

Filed Jan. 2, 1959 2 Sheets-Sheet 2

INVENTORS
Jiří Vackář
Stanislav Zadníček
By Richard [illegible] Agt 3,009,112

LOW-FREQUENCY AMPLIFIER CIRCUIT

Jiří Vackář and Stanislav Zadníček, Prague, Czechoslovakia, assignors to Tesla, narodni podnik, Prague, Czechoslovakia Filed Jan. 2, 1959, Ser. No. 784,507
9 Claims. (Cl. 329—106)

The present invention relates to low-frequency amplifier circuits, based on the use of length-modulated pulses whose carrier frequency lies above the frequency spectrum of signals to be amplified. The circuits consist basically of two amplifier tubes connected in push-pull and of two recuperation tubes, whose anodes are connected to the anodes of the amplifier tubes, the tubes operating via reactance chokes and a common output transformer into the load.

It is well known that the efficiency as well as the output power of low-frequency amplifiers may be considerably increased, especially with large power units, if the output stage of the amplifier is excited by pulses, whose carrier frequency lies in the supersonic region, these pulses being length-modulated by the low-frequency signal to be amplified. And if special circuits are included into the anodes of output tubes, such circuits consisting of load which may be considered as reactive in the region of pulse carrier frequency, and these are interconnected in a particular way, the energy stored in the magnetic fields of the loading reactances may be recuperated by suitably connected diodes.

The circuits based on the principle, briefly outlined in the foregoing paragraph, require altogether a relatively complicated equipment for producing the excitation voltages of sufficient levels and this particularly applies to the circuits of amplifier tubes, connected in series.

It is the object of the present invention to create a low-frequency amplifier circuit, enabling a considerable simplification of the source of control pulses and simultaneously improving the function of said source.

The layout and the manner of operation of the amplifier circuit, to which the present invention relates, may be best understood in connection with the accompanying drawings, in which.

Figure 1:
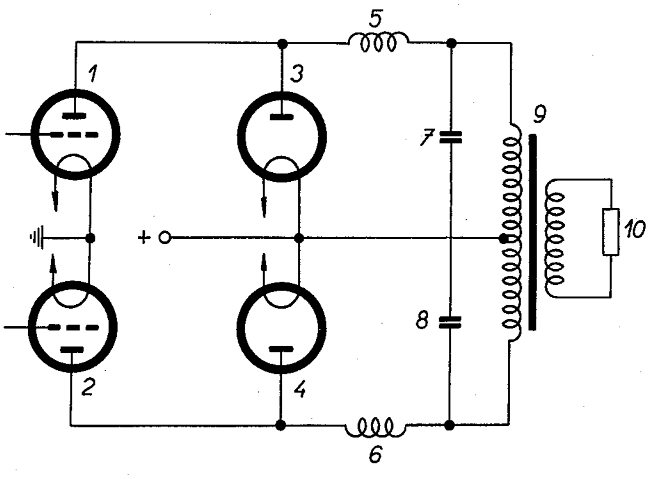
FIG. 1 shows the diagram of the fundamental circuit.

According to FIG. 1, diodes, connected in push-pull are used in the fundamental circuit as recuperation tubes. The arrangement of amplifier tubes 1, 2 is somewhat similar to the known circuits, but these tubes are connected to the primary winding of the output transformer 9, through coupling members consisting of inductive chokes 5, 6 and condensers 7, 8. The anodes of amplifier tubes 1, 2 are connected to the anodes of recuperation diodes 3, 4 whose cathodes are linked together and supplied from the positive terminal of a source of potential. The circuit differs from the usual push-pull amplifier in that the excitation voltage, applied to the grids of the tubes 1, 2, consists of groups of length-modulated pulses, whose modulation factor depends on the instantaneous value of the low-frequency voltage undergoing amplification. The groups of length-modulated pulses are applied either to the valve 1 or 2, according to the polarity of the low-frequency signal (in case of positive signal the tube 1 is excited and vice versa). This is shown diagrammatically in FIG. 2, where $U_{NF}$ represents the waveform of the low-frequency signal to be amplified and $Ug_1$ and $Ug_2$ respectively are the groups of length-modulated pulses applied to the grids of the amplifier tubes 1 and 2.

Figure 2:
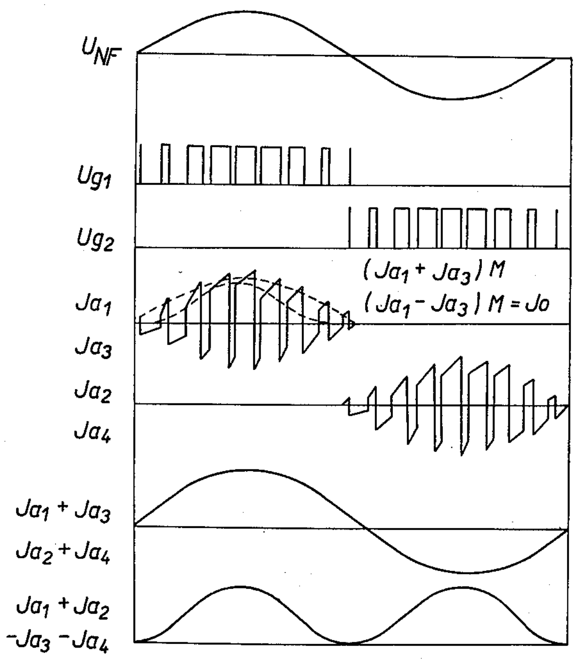
FIG. 2 illustrates the waveforms of voltages and currents in some key points of the circuit.

The amplifier resembles existing types of pulse-modulated low-frequency amplifiers in that current pulses are produced in the anode circuits of the tubes, the pulses increasing linearly during the active period of each pulse and decreasing during the period, in which the corresponding tube is cut-off. The magnetic fields produced by the inductances 5 or 6 cause electric currents to flow through the diodes 3 and 4. In FIG. 2 the waveforms of these currents are also shown. The pulse sequences marked $Ja_1$ and $Ja_2$ represent currents flowing in the anode circuits of the amplifier tubes 1 and 2, whilst $Ja_3$ and $Ja_4$ are the currents in diodes 3 and 4. In FIG. 2 also the average sums and differences of these current pulses are shown. The sums $(Ja_1+Ja_3)$ and $(Ja_2+Ja_4)$ represent the currents in the primary winding of the output transformer 9, whilst the respective differences show the current, which must be delivered into the circuit by the source of anode voltage. The pulses applied to the grids of tubes 1 and 2 undergo solely one condition, i.e. that their length-modulation factor must be—within the corresponding half-wave of the incoming LF-signal—a linear function of the low-frequency voltage to be amplified. Besides this all that is required is a sufficient amplitude of these pulses. The other characteristics of the pulse groups may be chosen quite arbitrarily. This especially applies to the relative phase angle and to the frequency of pulses. As to these factors, both pulse groups may be considered as fully independent. This is a considerable advantage in comparison with the existing amplifier circuits of this sort. On the other hand there is also a drawback inherent in the simple circuit, described above. The drawback consists in that there are unwanted losses of low-frequency energy arising in that diode, which belongs to the instantaneously inactive half of the push-pull circuit. The losses may be reduced by increasing the internal resistance of the recuperation diodes, but this leads to undesirable decrease of attainable efficiency within the active part of low-frequency operation cycle.

According to the present invention, this drawback may be eliminated by using low-impedance triodes (or tetrodes) instead of recuperation diodes. The internal resistance of these triodes is controlled by the voltage applied to their control grids, each such voltage being derived from the opposite side of the push-pull circuit in such a way, that the internal resistance of these tubes is very low and practically equal to the internal resistance of the formerly used diodes during the active part of the low-frequency cycle, whilst it is increased to an almost infinite value in the inactive region of the cycle. In this way the low-frequency energy losses are eliminated and the full theoretically possible efficiency is achieved. As to the other functions the circuit is equal to the existing push-pull circuits.

Figure 3:
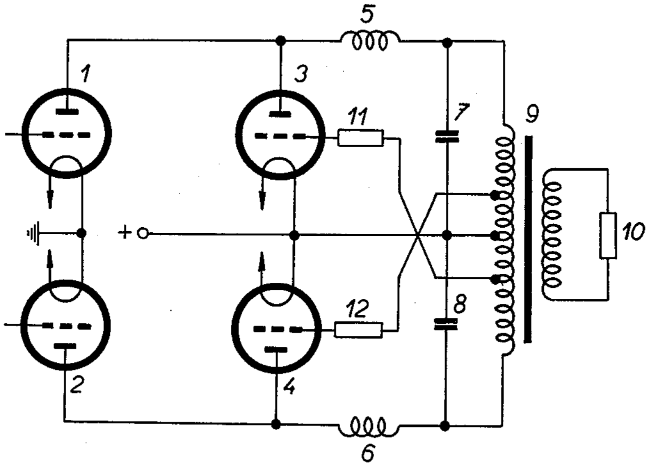
FIG. 3 is a circuit, to which triodes are used in function as recuperation tubes.

The push-pull circuit for amplifying low-frequency signals by means of length-modulated pulses, whose carrier frequency lies above the frequency band of signals to be amplified, the main features of which have been briefly outlined in the foregoing paragraph, is shown in FIG. 3. The circuit comprises in the output stage two amplifier tubes 1, 2 and two recuperation tubes 3, 4, operating via reactance chokes 5, 6 and via a common output transformer 9 into the common load 10. The cathodes of recuperation tubes 3, 4 are supplied by positive voltage from the positive terminal of the source and the tubes are provided with one or several grids, the potential of these grids being controlled by a low-frequency voltage derived from the signal undergoing amplification. The control voltage is taken either from one of the preceding stages or from the output.

In the case where triodes are used as recuperation tubes, the control voltage for their grids may, for instance, be derived from tappings provided on the primary winding of the output transformer, as may be seen in FIG. 3. Alternatively for the same purpose tappings of a resistive voltage divider may be used, the divider being connected in parallel to the forementioned primary transformer winding. The resistors 11, 12 also shown in FIG. 3, serve for limitation of grid currents in positive zones of excitation.

Figure 4:
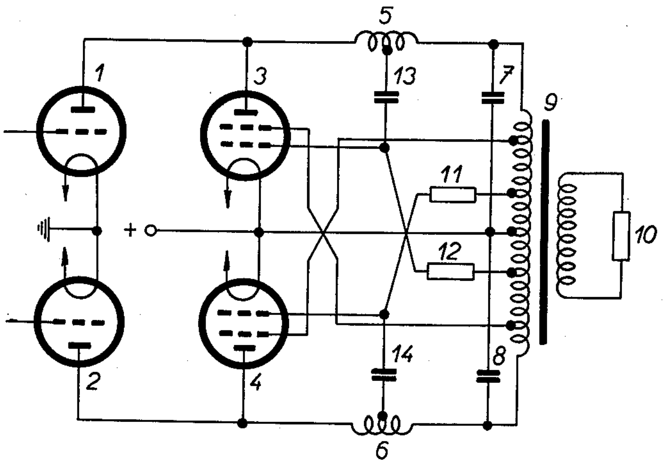
FIG. 4 represents a modified circuit, using tetrodes as recuperation tubes.

If tetrodes or pentodes are used as recuperation tubes, even the screen-grid voltages may be partly or wholly derived from the opposite sides of the push-pull circuit. This is shown in FIG. 4. In order to prevent the current loading of screen grids from rising above the admissible value during those periods of pulse excitation, in which the screen grid is on positive and the anode on negative potential (i.e. when the corresponding amplifier tube is opened), the controller screen grids may also be supplied with an additional pulse voltage, derived from the anode of same recuperation tube. Thereby the loading of the screen grid is limited within the periods, in which the anode is on positive potential. As shown in FIG. 4, the condensers 13, 14 may be used for this purpose, these condensers being connected between the control grids of recuperation tetrodes 3, 4 and the tappings on the pulse chokes 5, 6.

What we claim as new and desire to secure by Letters Patent of the United States, is:

1. In a low frequency amplification and demodulation circuit for width-modulated pulses whose relative width is proportional to the instantaneous value of a low frequency modulation signal and whose carrier frequency lies above the frequency spectrum of signals to be amplified, a pair of amplifier tubes coupled in push-pull relation to the primary of an output transformer, the modulated pulses corresponding to one polarity of said low frequency modulation signal being applied to the control grid of one of said amplifier tubes and the modulated pulses corresponding to the other polarity of said low frequency modulation signal being applied to the control grid of the other of said amplifier tubes, a pair of rectifying recuperation tubes having their respective plates connected to respectively different plates of said amplifier tubes, the cathodes of said recuperation tubes being connected to the center tap of the primary of said output transformer and to the positive terminal of a source of supply, and a pair of inductances connected respectively between interconnected plates and one end terminal of said primary.

2. The low frequency amplification and demodulation circuits as defined in claim 1, wherein said rectifying recuperation tubes are diodes.

3. The low frequency amplification and demodulation circuit as defined in claim 1, wherein each rectifying recuperation tube has at least a control grid that is connected to a tap on that half of said primary that is opposite the half to which the plate and cathode of the recuperation tube is connected.

4. The low frequency amplification and demodulation circuit as defined in claim 1, wherein said rectifying recuperation tubes are triodes.

5. The low frequency amplification and demodulation circuit as defined in claim 4, wherein a pair of voltage dividers are respectively connected in parallel with each of the halves of said primary winding, the control grid of each triode being connected to a tap on that voltage divider which is in parallel with that half of said primary that is opposite the half to which the plate and cathode of the triode is connected.

6. The low frequency amplification and demodulation circuit as defined in claim 1, wherein each of said rectifying recuperation tubes has at least a first grid to which is applied a low frequency voltage derived from the voltage of the low frequency signal that is amplified.

7. The low frequency amplification and demodulation circuit as defined in claim 1, wherein said rectifying recuperation tubes have at least control and screen grids.

8. The low frequency amplification and demodulation circuit as defined in claim 7, wherein the control and screen grids of each rectifying recuperation tube are connected to respective taps on that half of said primary which is opposite the half to which the plate and cathode of the recuperation tube is connected.

9. The low frequency amplification and demodulation circuit as defined in claim 8, wherein one of the grids of each rectifying recuperation tube is supplied by voltage pulses derived from its plate.

No references cited.